United States Patent [19]

Choi

[11] Patent Number: 5,586,104
[45] Date of Patent: Dec. 17, 1996

[54] APPARATUS FOR ELEVATING A POSITION DETERMINATION PIN AND A SPINDLE ASSEMBLY FOR DISC PLAYER

[75] Inventor: Youngsuk Choi, Seoul, Rep. of Korea

[73] Assignee: Daewoo Electronics Co., Ltd., Seoul, Rep. of Korea

[21] Appl. No.: 364,447

[22] Filed: Dec. 27, 1994

[30] Foreign Application Priority Data

Dec. 28, 1993 [KR] Rep. of Korea ...................... 93-29934
Dec. 28, 1993 [KR] Rep. of Korea ...................... 93-30145

[51] Int. Cl.⁶ .......................... G11B 23/00; G11B 33/02
[52] U.S. Cl. ........................................ 369/264; 369/75.2
[58] Field of Search ................................. 369/264, 752, 369/14, 15, 77.1; 360/99.05, 99.12

[56] References Cited

U.S. PATENT DOCUMENTS

| | | | |
|---|---|---|---|
| 5,177,731 | 1/1993 | Tanaka et al. | 365/264 |
| 5,299,185 | 3/1994 | Sakurai et al. | 369/75.2 |
| 5,301,176 | 9/1994 | Kawachi et al. | 369/75.2 |

FOREIGN PATENT DOCUMENTS 59-05404  1/1984  Japan ....................... 369/264

Primary Examiner—Robert S. Tupper
Assistant Examiner—David D. Davis
Attorney, Agent, or Firm—Oliff & Berridge

[57] ABSTRACT

Disclosed is an elevating apparatus of a disc player for moving up and down a spindle assembly and a position determination pin in a disc player for a combined use of a compact disc and a minidisc. The elevating apparatus includes a power, an elevating plate having a vertical guide plate provided with a cut portion and connected to the actuating member to be linearly moved, an elevating member hinged on one side of the elevating plate for converting a linear movement of the elevating plate into an elevating movement of the position determination pin, and the spindle assembly connected to the base plate and the vertical guide plate to be elevated conforming to the linear movement of the vertical guide plate. So, the elevating apparatus which can operate the spindle assembly and the position determination pin at the same time is simple in its construction thereby to lower the production cost.

11 Claims, 5 Drawing Sheets

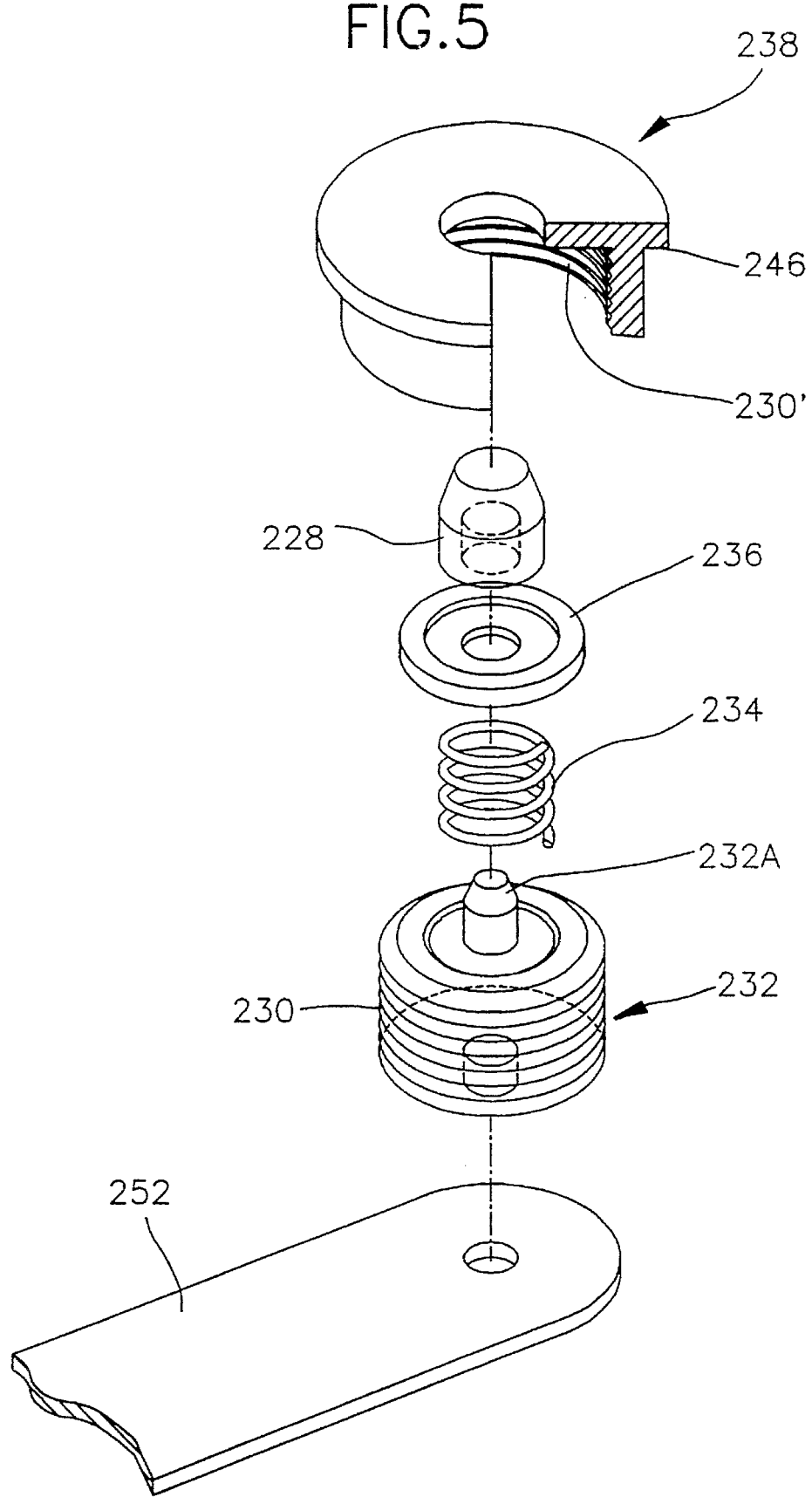

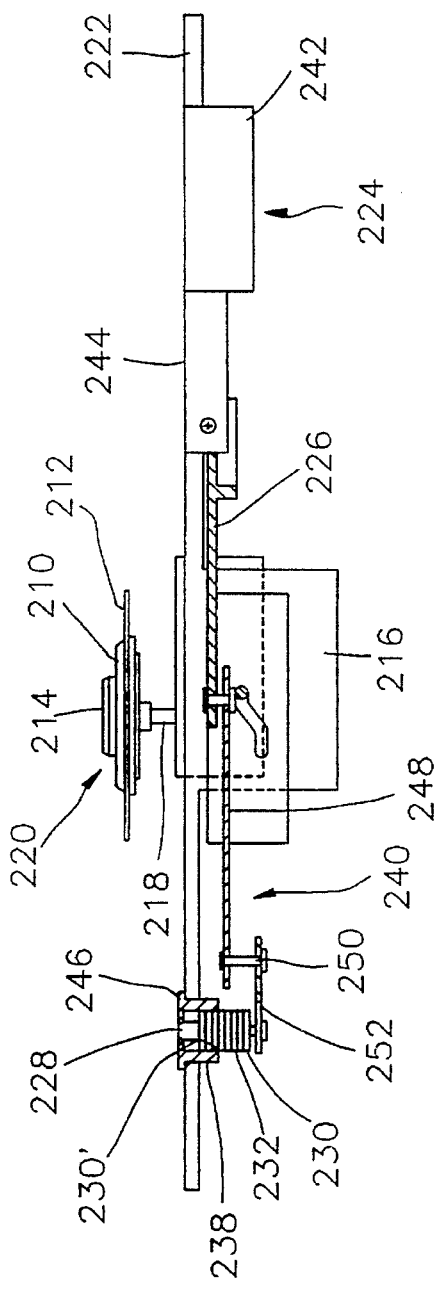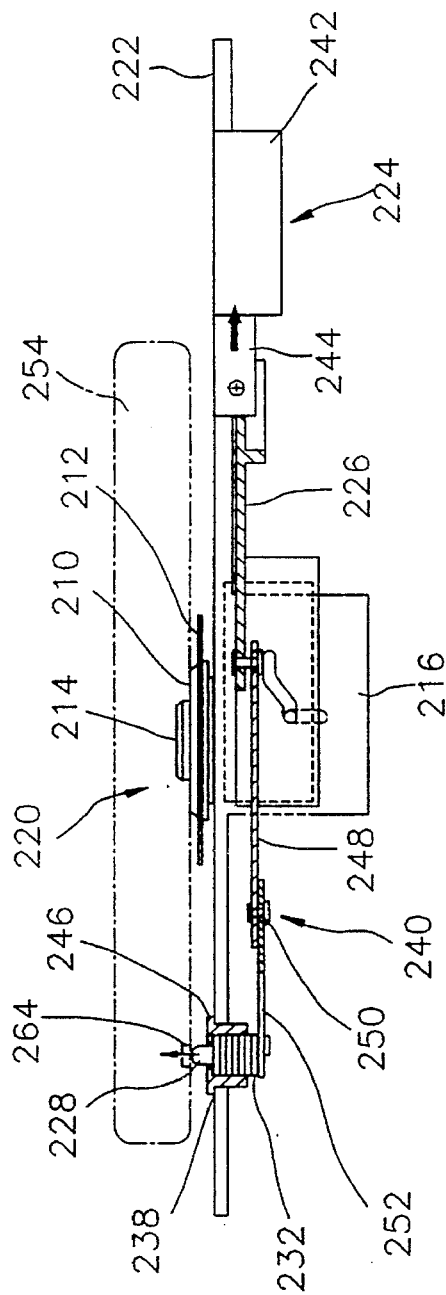

ically a naked disc and a cartridge encased-disc by means of
a pickup device and the spindle assembly.

APPARATUS FOR ELEVATING A POSITION DETERMINATION PIN AND A SPINDLE ASSEMBLY FOR DISC PLAYER

BACKGROUND OF THE INVENTION

1. Field of the Invention

The present invention relates to an apparatus for elevating a position determination pin and a spindle assembly for a disc player and more particularly, to an elevating apparatus for moving up and down the position determination pin and the spindle assembly in a disc player for playing alternatively a naked disc and a cartridge encased-disc by means of a pickup device and the spindle assembly.

2. Description of the Prior Arts

Nowadays, each of widely used minidisc player and compact disc player is used for reproduction of only one type of disc. Thus, if a user wants to obtain information from a different type of disc, it is necessary to separately buy a new player applicable thereto.

In general, the disc which is at a naked state or at an encased state in a cartridge is mounted on the tray to be loaded on the player. Such disc loading method depends on a structure of a disc player, so that a user can not load the discs by his own selection. Also, in fields of a common disc player used for reproducing discs of different sizes, although products which can reproduce the discs of different sizes such laser discs (LD), compact discs ,etc., can be manufactured, those can be applicable only to the discs of different sizes which are at the naked state.

Katsuichi Sakurai et al. proposes the disc player, capable of reproducing the discs, which is both at the naked state and at the encased state in the cartridge in E.P. Publication 525201 A2 (corres. U.S. Pat. No. 5,299,185).

Also, Hideo Kawachi et al. proposes the disc player capable of reproducing the discs, which is both at the naked state and at the encased state in the cartridge in E.P. Publication 518259 A3 (corres. U.S. Pat. No. 5,301,176).

Recently, the compact disc player which can selectively reproduce the compact disc and a minidisc by using a single optical pickup device and a single spindle assembly provided with a turntable, a spindle motor and a spindle shaft has been developed in order to improve disadvantages of the prior art minidisc player and compact disc player.

In the compact disc and minidisc player provided with the single spindle assembly and pickup device, since there is a predetermined height difference of compact disc tray and minidisc tray, double constructions therefor are needed in that player in order that the minidisc or the compact disc can be selectively mounted over the turntable constituting the spindle assembly. Also, the minidisc is mounted on a upper portion of the turntable constituting the spindle assembly and the compact disc is mounted on a lower portion of the turntable constituting the spindle assembly. Further, in the construction of this double turntable with difference of heights, since the discs which are mounted on respective mounting surfaces and the pickup device should always maintain a predetermined gap in reproducing the disc, the height of spindle assembly should be adjusted to the lower surface of the mounted disc.

In Hideo's patent is also disclosed an apparatus for elevating the spindle assembly wherein one side of a chassis supporting the spindle assembly of that apparatus is secured to a main chassis of the disc player and the spindle assembly can be moved up and down in a radial direction centering around the fixing point. Despite that, the apparatus for elevating the spindle assembly can be applicable to the naked and cartridge-encased discs of only the same size, so that a transfiguration of the player for driving the minidisc and compact disc of different sizes is demanded as necessary. Further, since only the one end of spindle assembly elevating apparatus is moved reciprocatingly with fixation of its other end, it is difficult to precisely adjust a position of the spindle assembly. Position determination pins to be inserted into four position determination grooves formed on a bottom surface of the cartridge encased-disc should be projected from the base plate in order to reproduce the cartridge encased disc. However, since the position determination pins put obstacles in the way of the mounting of the naked disc on the turntable, it is necessary to move those pins downward.

SUMMARY OF THE INVENTION

The present invention is intended to overcome the above-mentioned and numerous other disadvantages and deficiencies of the prior art.

Therefore, it is an object of the present invention to provide an apparatus for elevating a position determination pin and a spindle assembly for a disc player for playing a naked disc and a cartridge encased-disc provided with a single pickup device and a single spindle assembly having a turntable, a spindle motor and a spindle shaft in order to elevate the spindle assembly for rotating the naked disc and the cartridge encased-disc respectively.

To achieve the above-described object of the present invention, the disc player comprises:

a base plate;

an actuating member secured to the base plate to generate a linear moving force;

an elevating plate having a vertical guide plate with a cut portion and connected to the actuating member to be moved linearly;

a position determination pin to be inserted into a position determination groove of a cartridge-encased disc;

an elevating means hinged on one side of the elevating plate to convert a linear movement of the elevating plate into an elevating movement of the position determination pin; and a spindle assembly connected to the base plate and the vertical guide plate to be elevated depending on the linear movement of the vertical guide plate.

According to a first embodiment of the present invention, the position determination pin may have a helical portion on its surface.

According to a second embodiment of the present invention, the position determination pin may further include a bumper and an elevating guide member of the position determination pin.

When loading the compact disc, the spindle assembly is moved up and the position determination pin is lowered by means of the elevating plate, so that a predetermined gap between the single pickup apparatus and a recording surface of the compact disc is maintained and the position determination pin does not put obstacles in the way of the loading of the compact disc. To the contrary, when loading the minidisc, the spindle assembly is lowered and the position determination pin is moved up by means of the elevating plate, so that a predetermined gap between the single pickup apparatus and a recording surface of the minidisc is maintained and the position determination pin can be inserted into the position determination groove.

BRIEF DESCRIPTION OF THE DRAWINGS

The present invention may be better understood and its numerous objects and advantages will be more apparent to those skilled in the art by reference to the accompanying drawings in which:

FIG. 5 is an exploded perspective view for showing a position determination pin of minidisc according to second embodiment of the present invention;

FIG. 6A is a side view for showing a position of a spindle assembly and a position determination pin of compact disc in loading compact disc; and FIG. 6B is a side view for showing positions of a spindle assembly and a position determination pin of minidisc in loading compact disc.

DETAILED DESCRIPTION OF THE PREFERRED EMBODIMENTS

The preferred embodiments of the present invention will be described in detail with reference to the accompanying drawings.

EMBODIMENT 1

Figure 1:
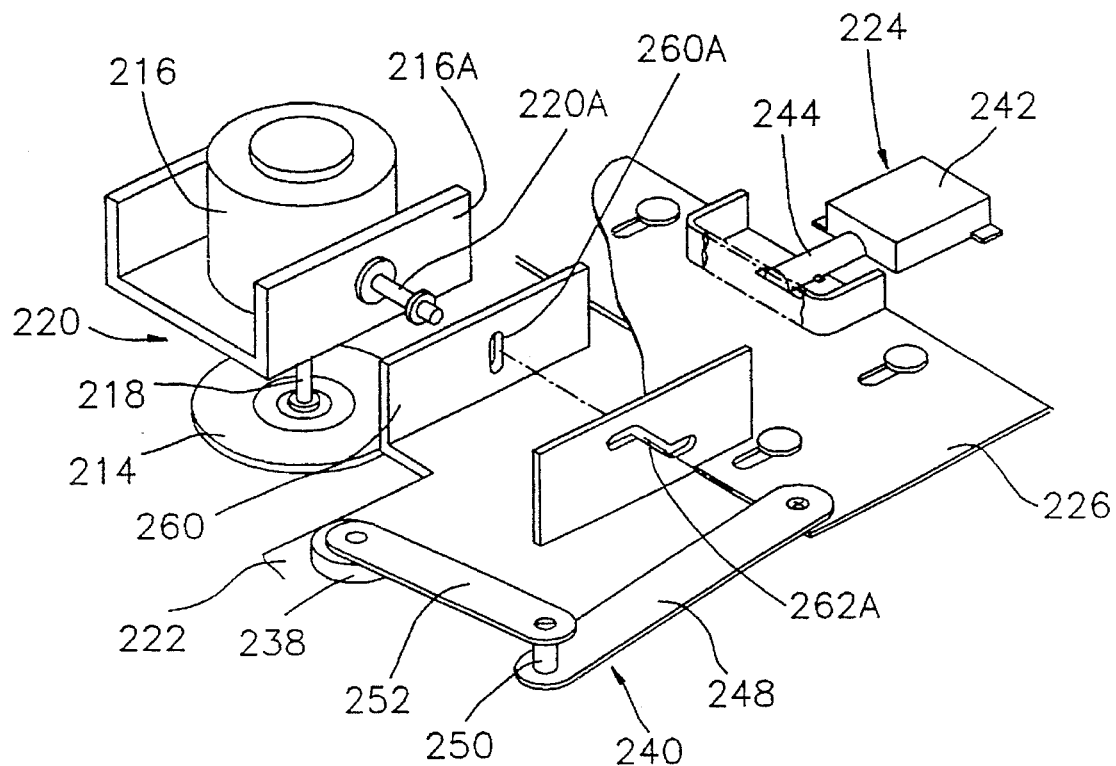
FIG. 1 is an exploded perspective view for showing a bottom portion of a spindle assembly of a disc player and an elevating apparatus of a position determination pin of minidisc according to first embodiment of the present invention.

FIG. 1 is an exploded perspective view for showing a bottom portion of a spindle assembly of a disc player and an elevating apparatus of a position determination pin of minidisc according to a first embodiment of the present invention.

A spindle assembly 220 is provided with a spindle motor 216. A guide rod 220A is projected from a side wall of a housing 216A to which spindle motor 216 is secured. A turntable 214 is secured to a spindle shaft 218. On an upper surface of turntable 214 is formed a minidisc mounting surface 210 and on a lower surface of turntable 214 is formed a compact disc mounting surface 212.

A side plate 260 is stretched in a upright direction on one side of base plate 222 and has a vertical cut portion 260A into which a guide rod 220A is inserted. A pin guiding member 238 for the position determination pin is projected from a bottom surface of other side of base plate 238. A second link 252 is hinged on this pin guiding member 238. The pin guiding member 238 includes a body 232 which has a helical portion and the position determination pin 228 which is projected from a upper surface of body 232.

Elevating plate 226 is disposed on a lower surface of base plate 222. One end of first link 248 is hinged on an edge of elevating plate 226. An other end of first link 248 is hinged on one end of second link 252. Guide plate 262 is disposed on one side of elevating plate 226 in parallel to side plate 260. A guide cut portion 262A for guiding an elevation of guide rod 220A is formed on guide plate 262.

An actuation member 224 is disposed on an opposite side to guide plate 262 and has an actuation rod 244 secured to elevating plate 226 and a solenoid 242 for applying a linear reciprocating force to actuation rod 244.

Figure 2:
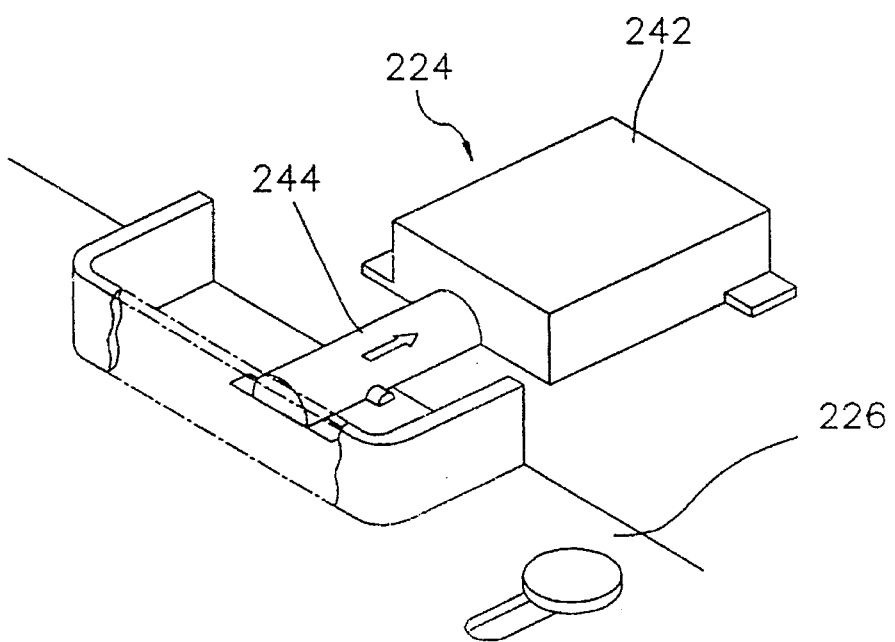
FIG. 2 is a detailed view for showing an actuating member and an elevating plate of the disc player of FIG. 1.

FIG. 2 is a detailed view for showing an actuating member and an elevating plate of the disc player of FIG. 1.

Solenoid 242 is electrically connected to a micro processor disposed on a printed circuit board. When the minidisc is mounted to be loaded, the micro processor senses the minidisc by means of a sensor to flow current through solenoid 242. Then, solenoid 242 generates an electromagnetic attraction in an arrow direction as shown in FIG. 2 to attract actuation rod 244 into it.

Figure 3A:
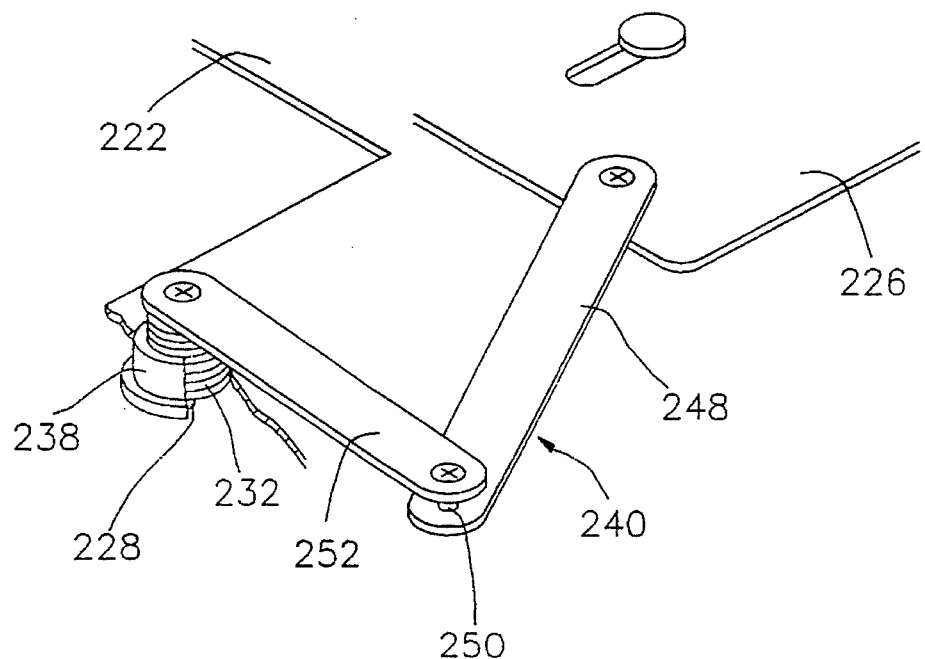
FIGS. 3A and 3B are schematic views for showing the operation of the elevating apparatus of FIG. 1.
Figure 3B:
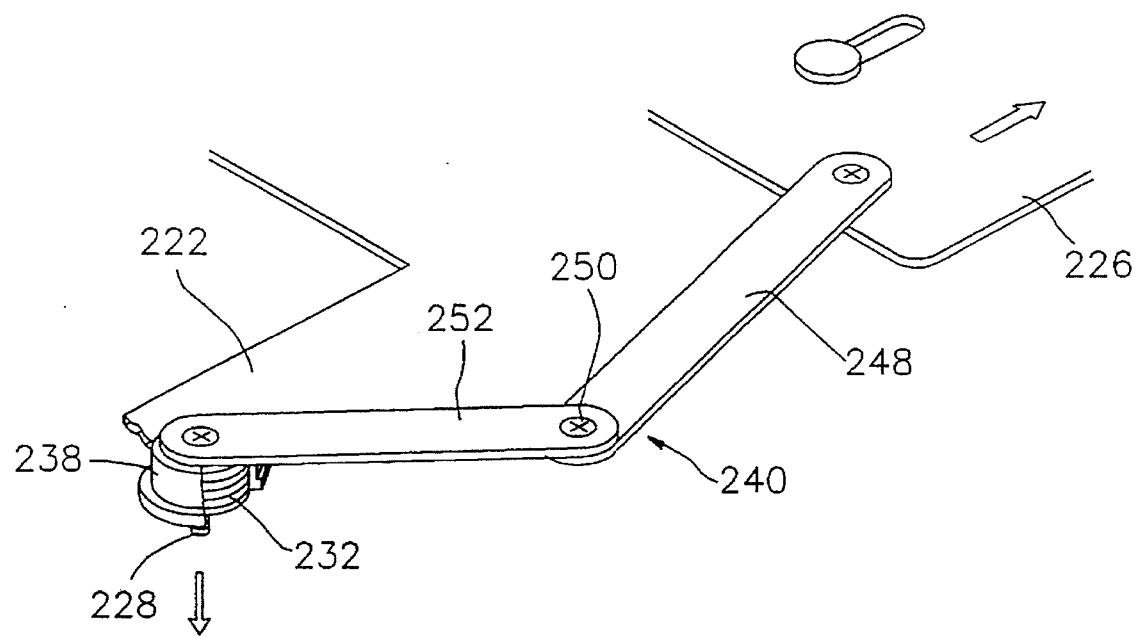
Figure 4:
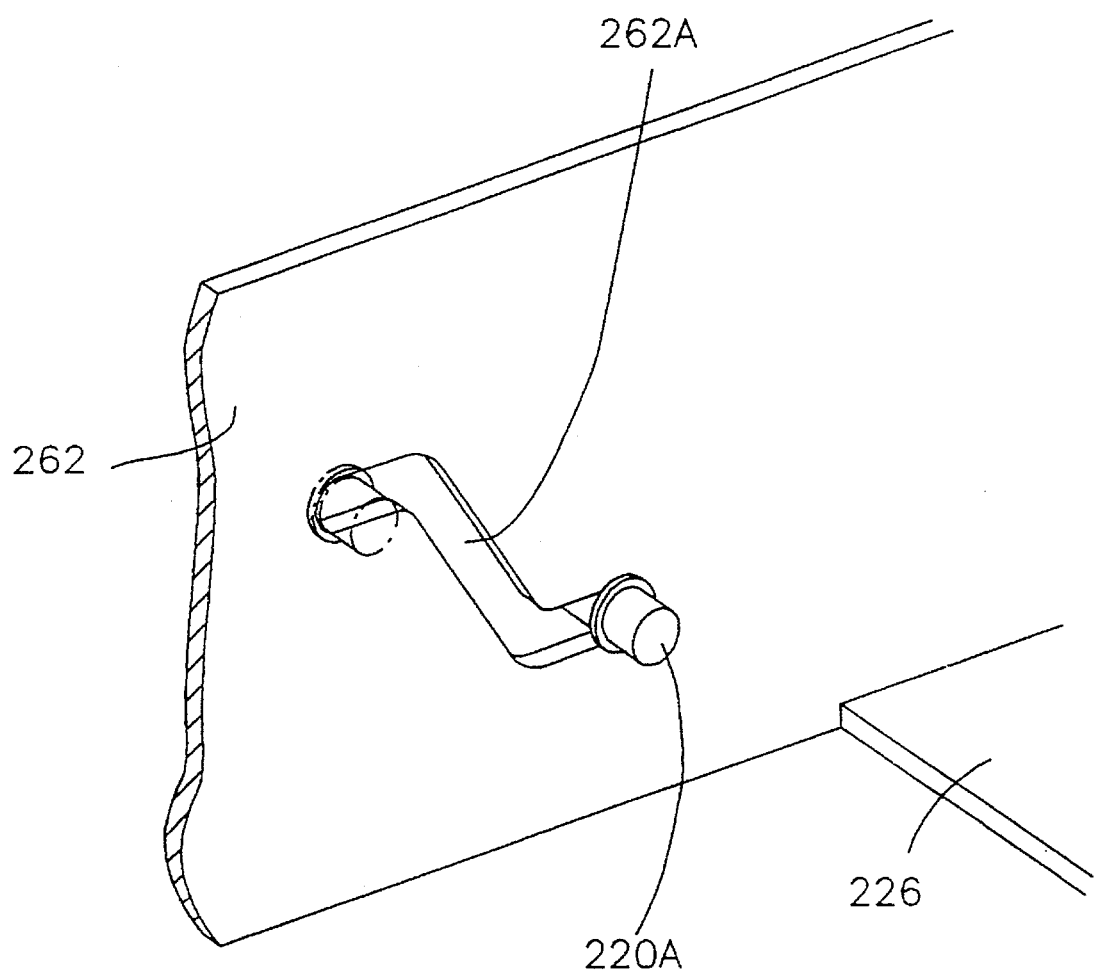
FIG. 4 is a schematic view for showing a lowering operation of a guide pin of the spindle assembly of FIG. 1 in loading a minidisc cartridge.

FIGS. 3A and 3B are schematic views for showing the operation of the elevating apparatus of FIG. 1. Actuation rod 244 is attracted toward the inside of solenoid 242 by means of the electromagnetic attraction, so that elevating plate 226 is moved in the arrow direction, first link 248 is moved in the arrow direction thereby to rotate second link centering around pin guiding member 238 for the position determination pin. As a result, body 232 of pin guiding member 238 is rotated to be moved up along the helical portion, so that position determination pin 228 is moved up to be protruded from the upper surface of base plate 222. At the same time, guide plate 262 which stands in parallel to side plate 260 is moved in the same direction as elevating plate 226, so that, as shown in FIG. 4, guide rod 220A inserted into guide cut portion 262A of guide plate 262 is lowered to move the turntable downward. Position determination pin 228 of the minidisc is inserted into a position determination groove 264 of the minidisc cartridge mounted on minidisc mounting surface 210 of the turntable 214 (see FIG. 6B). Since minidisc mounting surface 210 is formed on the upper position as compared with compact disc mounting surface 212, the gap between pickup (not shown) and a bottom surface of the minidisc become large. Thus, as described above, when mounting the minidisc thereon, the turntable is moved up to maintain the gap between the pickup and the minidisc face appropriately.

FIG. 6B is a side view for showing positions of the spindle assembly and the position determination pin of minidisc in loading compact disc. As shown, actuation rod 244 is attracted toward the inside of solenoid 242, so that spindle assembly 220 is lowered by guiding cut portion 262A of guide plate 262 disposed on elevating plate 226 and at the same time, position determination pin 228 of the minidisc is moved up to be inserted into position determination groove 264 and then play the minidisc.

To the contrary, in mounting and loading the compact disc, position determination pin 228 may put obstacles in the way of this operation. So, in this embodiment as shown in FIG. 6A, solenoid 242 pushes actuation rod 244, so that elevating plate 226 is moved oppositely the movement direction of elevating plate 226 in loading of the minidisc. As elevating plate 226 is moved, guide rod 220A is guided by guiding cut portion 262A to be moved up. Turntable 214 secured to guide rod 220A is also moved up to maintain the gap between the pickup and the bottom face of the compact disc appropriately. At the same time, since position determination pin 228 of the minidisc is lowered, this pin 228 does not put obstacles in the way of a reproduction of the compact disc any longer. Meanwhile, a rotation tolerance of second link 252 and a backlash between a helical portion 230 of body 232 and a helical portion 230' of pin guiding member 238 may cause position determination pin 228 to be moved up more, thereby to excessively stick a top portion of body 232 fast to an inside surface of pin guiding member 238. But, the use of position determination pin 228 according to a following embodiment can solve the above problem.

EMBODIMENT 2

FIG. 5 is an exploded perspective view for showing a position determination pin of minidisc according to a second embodiment of the present invention. The position determination pin of the present embodiment is the same as Embodiment 1 except for an addition of a stopper and a spring thereto. The parts which are the same as those shown in FIGS. 1 through 4 are indicated by the same reference numerals.

In the position determination pin according to the present embodiment, body 232 secured to second link 252 has a helical portion 230. A projection 232A is projected from a top portion of body 232. Projection 232A is inserted into a spring 234 as a bumper and a stopper 236 which is put on an upper portion of spring 234. In order that projection 232A can be inserted, a central portion of stopper 236 has a through hole. Projection 234A is tightly secured to a lower hole of position determination pin 228. An pin guiding member 238 of position determination pin 228 is secured to the base plate and has a helical portion 230'. An engaging jaw 246 is formed around an outer periphery of a top portion to be safely fastened to base plate 222.

An operation of position determination pin 228 will be described in the following. As second link 252 is rotated, body 232 is rotated and then helical portion 230 is rotated along helical portion 230' to be moved up. Stopper 236 which is disposed between position determination pin 228 and projection 232A to be movably inserted thereinto is contacted to the inside wall of elevating guide member 238. Hereinafter, despite body 232 being further moved up, since stopper 236 is not adhered to projection 232A, body 232 can be further moved up without any difficulties. Helical portion 230 of body 232 and helical portion 230' of pin guiding member 238 are fastened to each other by an elastic force of spring 234, so that the back lash formed therebetween can be removed.

In the apparatus for elevating the spindle assembly and the position determination pin of the present invention, the elevating plate moves up the spindle assembly and the position determination pin is moved down in loading the compact disc. To the contrary, the elevating plate moves down the spindle assembly and the position determination pin is moved up in loading the minidisc. Therefore, the gap between the pickup apparatus and the recording surfaces of the minidisc or the compact disc can be maintained appropriately, so that the position determination pin does not put an obstacle in the way of the loading operation of the compact disc. Also, the elevating apparatus which can operate the spindle assembly and the position determination pin at the same time is simple in its construction thereby to lower the production cost.

It is understood that various other modifications will be apparent to and can be readily made by those skilled in the art without departing from the scope and spirit of this invention. Accordingly, it is not intended that the scope of the claims appended thereto be limited to the description as set forth herein, but rather that the claims be constructed as encompassing all the features of the patentable novelty that reside in the present invention, including all the features that would be treated as equivalents thereof by those skilled in the art to which this pertains.

What is claimed is:

1. A disc player comprising:

a base plate;

an actuating member secured to said base plate to generate a linear moving force;

an elevating plate having a vertical guide plate provided with a guide cut portion and connected to said actuating member to be moved linearly according to said linear moving force of said actuating member;

a pin guiding member mounted through said base plate and having a body inserted in said pin guiding member and a position determination pin mounted on an upper portion of said body, wherein said position determination pin is moved upwards and downwards when said body is rotated to move upwards and downwards in said pin guiding member and said position determination pin converts a linear movement of said elevating plate into an elevating movement;

an elevating apparatus having first and second links, one end of each of said first and second links being hinged on each other, the other end of said first link being hinged on said elevating plate, the other end of said second link being mounted on said body of said pin guiding member; and a spindle assembly having a guide rod connected to said guide cut portion of said vertical guide plate to be moved upwards and downwards by the linear movement of said vertical guide plate.

2. The disc player as claimed in claim 1, wherein said pin guiding member further comprises a bumper device between said position determination pin and said body.

3. The disc player as claimed in claim 2, wherein said pin guiding member further has a stopper between said position determination pin and said bumper device.

4. The disc player as claimed in claim 3, wherein said bumper device is a coil spring.

5. The disc player as claimed in claim 1, wherein said spindle assembly has a spindle motor for generating a rotating force and said guide rod connected to said guide cut portion for rotating both a cartridge-encased disc and a naked disc by the rotating force.

6. The disc player as claimed in claim 1, wherein said actuating member is a solenoid device.

7. The disc player as claimed in claim 1, wherein said guide cut portion is a stepped shape of cut portion.

8. The disc player as claimed in claim 1, wherein said guide cut portion has an upper horizontal slit portion and a lower horizontal slit portion, said upper and lower horizontal slit portions being in communication with each other.

9. A disc player comprising:

a base plate;

a solenoid device having an actuation rod and secured to said base plate to generate a linear moving force, wherein said solenoid device attracts said actuation rod toward an inside portion of said solenoid and pushes said actuation rod out of said solenoid;

an elevating plate having a vertical guide plate with a guide cut portion and connected to said actuation rod of said solenoid device to be moved linearly;

a pin guiding member mounted through said base plate and having a body inserted in said pin guiding member and a position determination pin mounted on an upper portion of said body, wherein said position determination pin is moved upwards and downwards when said body is rotated to move upwards and downwards in said pin guiding member and said position determination pin converts a linear movement of said elevating plate into an elevating movement so as to be inserted into a position determination groove of a cartridge-encased disc;

an elevating apparatus having first and second links, one end of each of said first and second links being hinged on each other, the other end of said first link being hinged on said elevating plate, the other end of said second link being hinged on said body of said position determination pin; and a spindle assembly connected to said vertical guide plate to be elevated by the linear movement of said vertical guide plate.

10. The disc player as claimed in claim 9, wherein said pin guiding member further has a stopper between said position determination pin and a bumper device located between said position determination pin and said body.

11. The disc player as claimed in claim 10, wherein said bumper device is a coil spring.

* * * * *